United States Patent
Moll et al.

(10) Patent No.: US 10,391,980 B2
(45) Date of Patent: Aug. 27, 2019

(54) END CAP FOR WIPER ASSEMBLY

(71) Applicant: TRICO PRODUCTS CORPORATION, Rochester Hills, MI (US)

(72) Inventors: Kyle Moll, Oxford, MI (US); C. Joseph Thielen, Shelby Township, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 14/107,128

(22) Filed: Dec. 16, 2013

(65) Prior Publication Data

US 2015/0166015 A1    Jun. 18, 2015

(51) Int. Cl.
*B60S 1/38*    (2006.01)

(52) U.S. Cl.
CPC ........... *B60S 1/3886* (2013.01); *B60S 1/3887* (2013.01); *B60S 1/3894* (2013.01); *B60S 1/3896* (2013.01); *B60S 1/381* (2013.01); *B60S 1/3889* (2013.01); *B60S 1/3891* (2013.01); *Y10T 403/70* (2015.01)

(58) Field of Classification Search
CPC .... B60S 1/3886; B60S 1/3887; B60S 1/3889; B60S 1/3891; B60S 1/3893; B60S 1/3894; B60S 1/3896; B60S 1/381
USPC ........ 15/250.32, 250.201, 250.451, 250.452, 15/250.453, 250.454, 250.361, 250.43, 15/250.44
See application file for complete search history.

(56) References Cited

U.S. PATENT DOCUMENTS

| | | | |
|---|---|---|---|
| 6,668,419 B1 | 12/2003 | Kotlarski | |
| 8,020,246 B2 | 9/2011 | Bauer et al. | |
| 8,196,252 B2 | 6/2012 | Henin | |
| 8,307,494 B2 | 11/2012 | Boland | |
| 8,327,500 B2 | 12/2012 | De Block et al. | |
| 8,341,801 B2 | 1/2013 | Coos | |
| 8,402,593 B2 | 3/2013 | Boland | |
| 2007/0174989 A1 | 8/2007 | Moll et al. | |
| 2008/0222833 A1 | 9/2008 | Henin et al. | |
| 2008/0313843 A1 | 12/2008 | Chou | |
| 2009/0106928 A1 | 4/2009 | Lee | |
| 2010/0037417 A1 | 2/2010 | Moll et al. | |
| 2010/0058552 A1* | 3/2010 | Coos | B60S 1/38 15/250.3 |
| 2010/0107353 A1 | 5/2010 | Boland | |
| 2010/0139026 A1 | 6/2010 | Ku | |

(Continued)

FOREIGN PATENT DOCUMENTS

| | | | | |
|---|---|---|---|---|
| KR | 10-1166494 | * | 7/2012 | ........... B60S 1/3889 |
| WO | 2007122569 A2 | | 11/2007 | |
| WO | 2009115408 A1 | | 9/2009 | |

OTHER PUBLICATIONS 10-1166494 (machine translation), 2012.*

(Continued)

*Primary Examiner* — Andrew A Horton
(74) *Attorney, Agent, or Firm* — Miller Canfield

(57) ABSTRACT

An end cap for a wiper assembly includes a body adapted to be disposed over a portion of a plurality of splines of the wiper assembly. The body includes a separator adapted to cooperate with the splines of the wiper assembly to separate and retain the splines laterally from movement for a wiping element of the wiper assembly disposed between the splines.

19 Claims, 5 Drawing Sheets

(56) References Cited

U.S. PATENT DOCUMENTS

2010/0257687 A1   10/2010  Huang
2012/0102669 A1    5/2012  Lee et al.
2012/0124767 A1    5/2012  Thielen et al.

OTHER PUBLICATIONS

KR101166494B1 (English translation), 2012.*
Mar. 31, 2015 International Search Report and Written Opinion for PCT/US2014/069961.
Jul. 26, 2012 International Search Report and Written Opinion for PCT/US2011/061827.

* cited by examiner

END CAP FOR WIPER ASSEMBLY

BACKGROUND OF THE INVENTION

1. Field of the Invention

The present invention relates generally to wiper assemblies for vehicles and, more specifically, to an end cap for a wiper assembly.

2. Description of the Related Art

Conventional wiper systems for vehicles known in the related art include some type of wiper assembly mounted to a wiper arm which, in turn, is mounted adjacent a surface to be wiped such as a windshield of the vehicle and pivotally driven to impart reciprocal motion to the wiper assembly across the windshield. The wiper assembly typically includes a rubber wiping element that contacts the windshield across the surface to be wiped. The wiper assembly often incorporates a support member in the form of one or more metal strips that act to reinforce the wiping element and facilitate wiping contact by the wiping element across what is typically a curved glass surface. In this context, the wiper arm delivers a downward force to the wiper assembly that is distributed thereacross pressing the wiper assembly into contact with the windshield. The wiper assembly may also include an airfoil and a pair of end caps located at the distal ends of the wiper assembly. The wiper assembly may also include a coupler that connects the wiper assembly to the wiper arm.

Generally, the support member may be a single monolithic beam or a pair of splines or rails. For the monolithic beam, the wiping element is typically attached to the beam by a suitable mechanism such as an adhesive and there may be no need for an end cap. For the pair of splines, the wiping element typically has an opposed pair of grooves extending longitudinally with one of the grooves receiving one of the splines. An end cap is typically needed to hold the splines and wiping element together, as well as to retain an airfoil.

Current wiper assemblies that utilize end caps typically have a solid closed end and are attached to the splines of the support member. The solid closed end provided a high insertion force and high retention force on the splines, making the wiper assembly as strong as possible. However, recently, these end caps have been provided with openings in the closed end to allow water to drain through the wiper assembly when the wiper arm is in a service or up position. This type of end cap provided a low insertion force and a high retention force on the splines.

One disadvantage of the above wiper assemblies is that the splines may pinch the wiping element resulting in lower performance of the wiping assembly when the wiping element moves back and forth across the surface of the glass. Another disadvantage is that the splines may move laterally once the end cap is attached to the splines.

Accordingly, it is desired to improve the performance of the wiping element for the wiper assembly as it moves back and forth across the surface to be wiped. It is also desirable to separate the splines and retain the separated splines once the end cap is assembled in the wiper assembly. Therefore, there is a need in the art for an end cap that meets at least one of these desires.

SUMMARY OF THE INVENTION

The present invention overcomes the disadvantages in the related art in an end cap for a wiper assembly including a body adapted to be disposed over a portion of a plurality of splines of the wiper assembly. The body includes a separator adapted to cooperate with the splines of the wiper assembly to separate and retain the splines laterally from movement for a wiping element of the wiper assembly disposed between the splines.

In addition, the present invention is a wiper assembly including a wiping element adapted to contact a surface to be wiped. The wiper assembly also includes a support member acting to support the wiping element. The wiper assembly further includes an airfoil operatively mounted to the support member and a pair of end caps operatively mounted to longitudinal ends of the support member with the airfoil disposed therebetween. The support member includes a plurality of splines and the end caps include a separator to separate and retain the splines laterally for the wiping element disposed between the splines.

In this way, the end cap of the present invention separates splines of the support member for the wiper assembly and retains them from lateral movement. The end cap of the present invention has a separator in the form of a pair of channels that mate with a pair of tangs on the splines to separate the splines and retain the splines from lateral movement. In addition, the end cap separates and retains the splines in parallel positions to allow the wiping element to move freely, which offers enhanced wipe quality performance. The present invention can be used for wiper systems in any type of transportation from automotive vehicles, heavy-duty trucks, trains, air planes, ships, large construction vehicles, or military vehicles or any other type of vehicles that contain surface wiper systems.

Other objects, features, and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
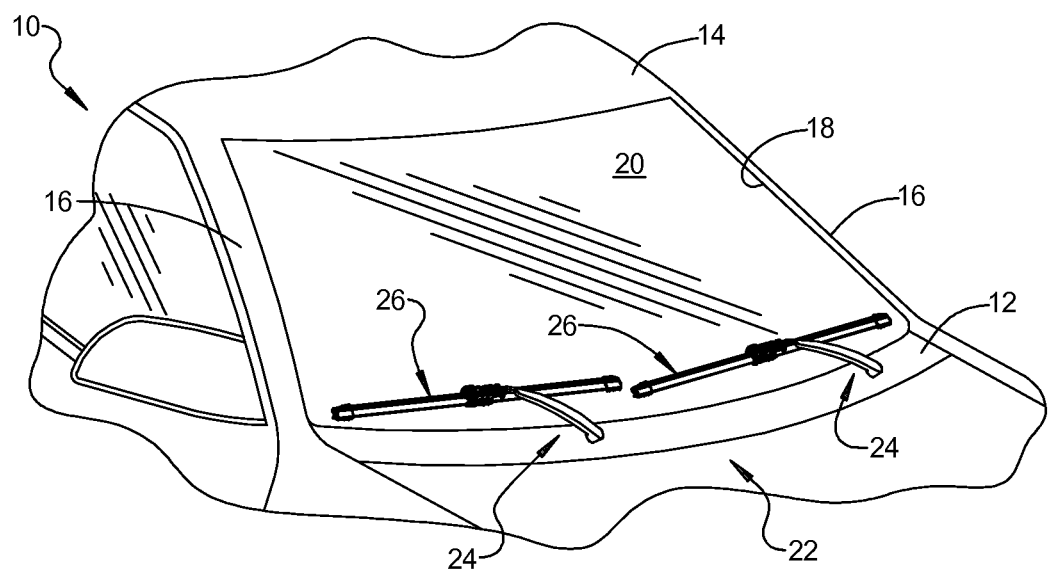
FIG. 1 is a partial perspective view of a front of a vehicle having a wiper system including a pair of wiper assemblies, according to one embodiment of the present invention, pivotally mounted for reciprocal movement across a windshield of the vehicle.

Referring now to the figures, where like numerals are used to designate like structure, a portion of a vehicle is schematically illustrated at 10 in FIG. 1. The vehicle 10 includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20. As illustrated, the vehicle 10 is an automotive vehicle, but may be any type of vehicle such as heavy-duty trucks, trains, air planes, ships, large construction vehicles, or military vehicles or any other type of vehicle that contain surface wiper systems.

A wiper system is generally indicated at 22 in FIG. 1 and is employed to clean the windshield 20. The wiper system 22 includes a pair of wiper arms, generally indicated at 24, and a pair of wiper assemblies, according to one embodiment of the present invention and generally indicated at 26, which correspond to the driver and passenger side of the vehicle 10. However, those having ordinary skill in the art will appreciate that the wiper system 22 could employ a single wiper arm 24 and a single wiper assembly 26 without departing from the scope of the present invention.

Figure 2:
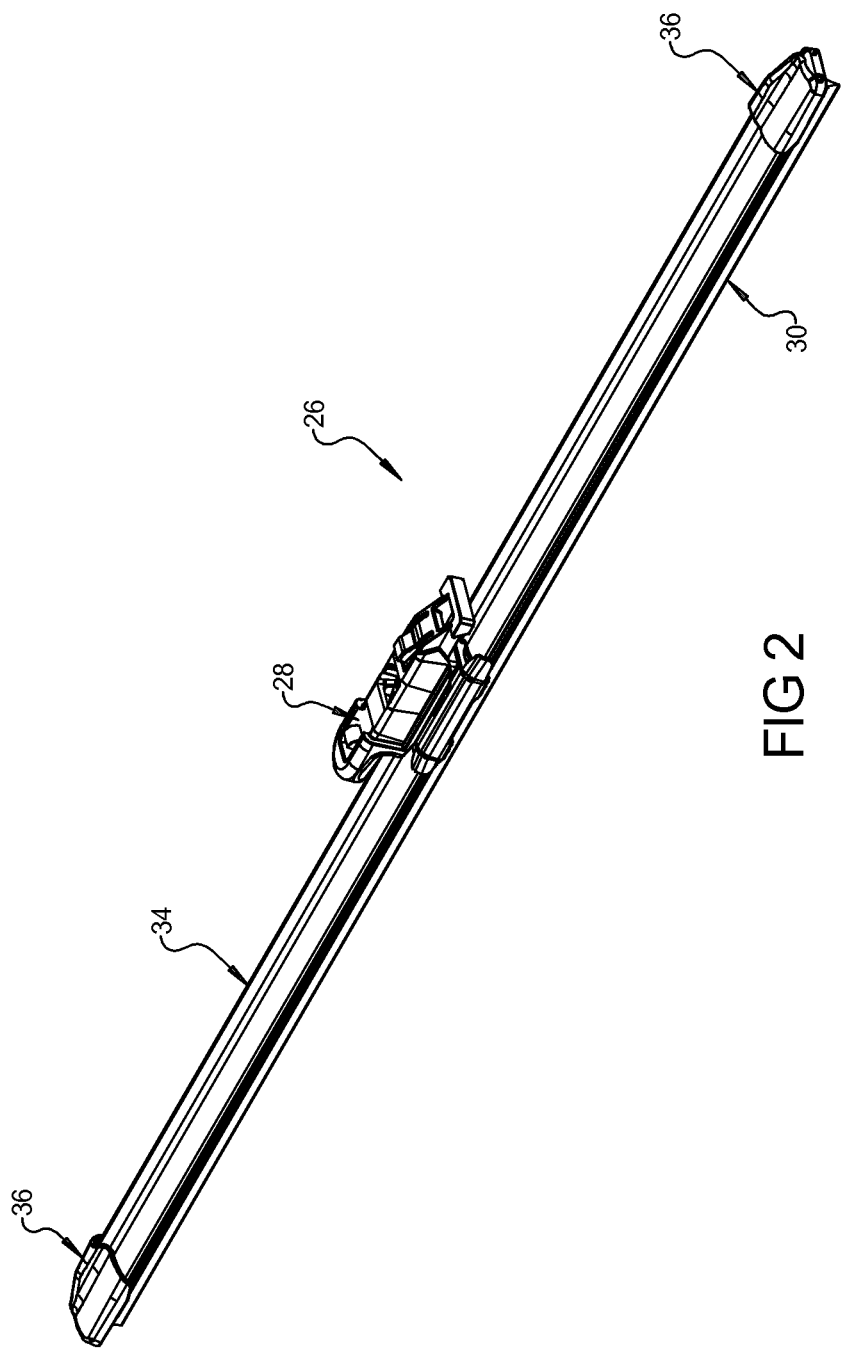
FIG. 2 is an enlarged perspective view of one of the wiper assemblies, according to one embodiment of the present invention, of FIG. 1.

In the representative example illustrated in FIGS. 1 and 2, each wiper assembly 26 is carried by a corresponding wiper arm 24. In addition, the wiper assembly 26 may include a coupler, generally indicated at 28, that acts to connect the wiper assembly 26 to the wiper arm 24. The wiper system 22 also includes an electrical motor (not shown, but generally known in the art) to move the wiper assemblies 26 in an oscillating manner across the surface of the windshield 20.

While the wiper assembly 26 illustrated in FIG. 1 is shown in connection with the front windshield 20 of the vehicle 10, those having ordinary skill in the art will appreciate that wiper assemblies 26 may be employed in other areas of the vehicle 10, such as a rear window (not shown) or a head lamp (not shown) that employs a wiper system. Thus, it will be understood that the present invention is not limited for use solely in connection with wiper arms 24 adapted for use on a vehicle's windshield 20, but for use in all applications where wiper arms 24 are employed.

Figure 3:
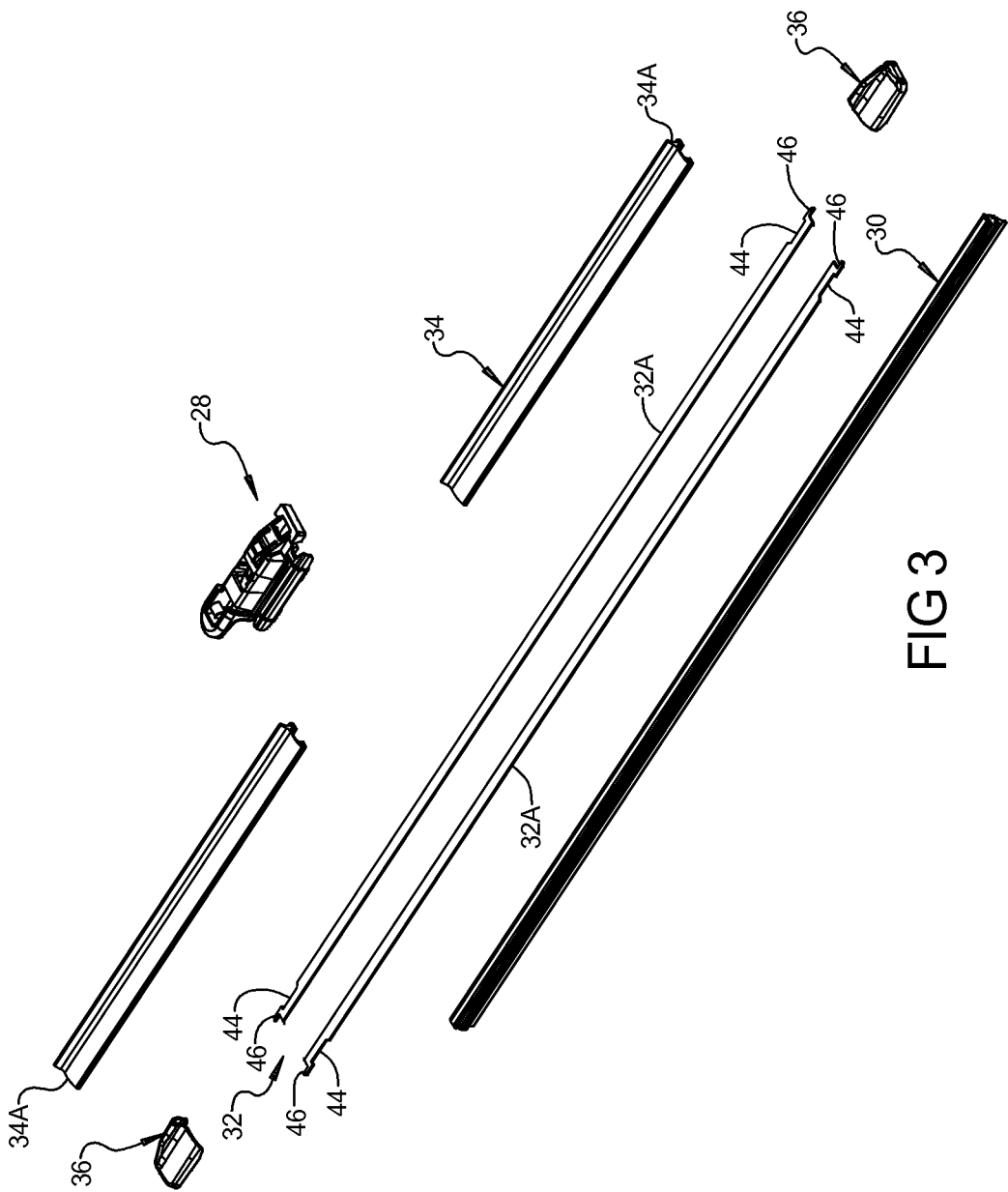
FIG. 3 is an exploded perspective view of the wiper assembly, according to one embodiment of the present invention, of FIG. 2.
Figure 4:
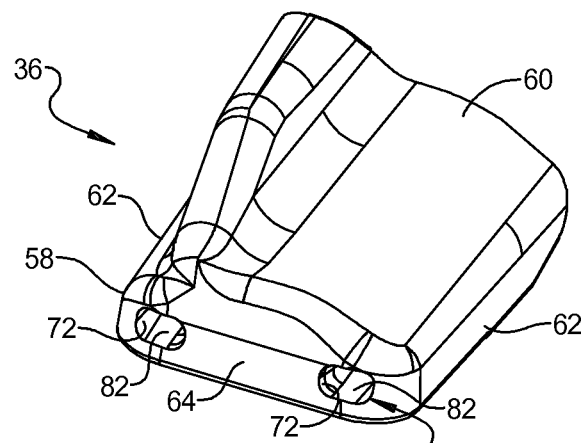
FIG. 4 is a perspective view of an end cap, according to one embodiment of the present invention, of the wiper assembly of FIG. 2.
Figure 5:
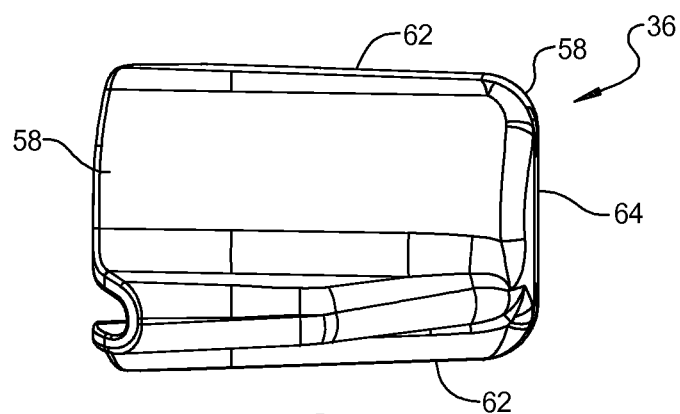
FIG. 5 is a top view of the end cap, according to one embodiment of the present invention, of the wiper assembly of FIG. 2.
Figure 6:
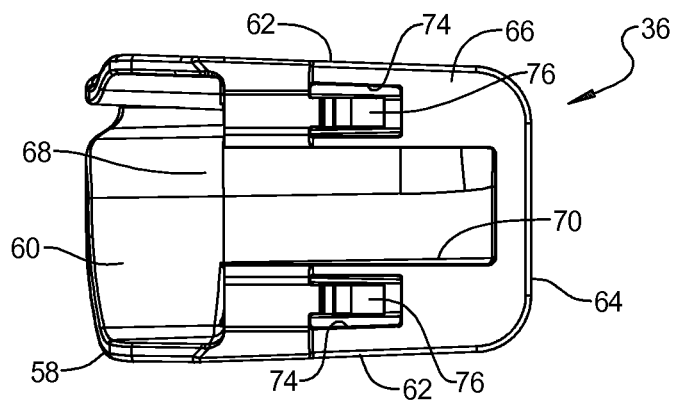
FIG. 6 is a bottom view of the end cap, according to one embodiment of the present invention, of the wiper assembly of FIG. 2.
Figure 7:
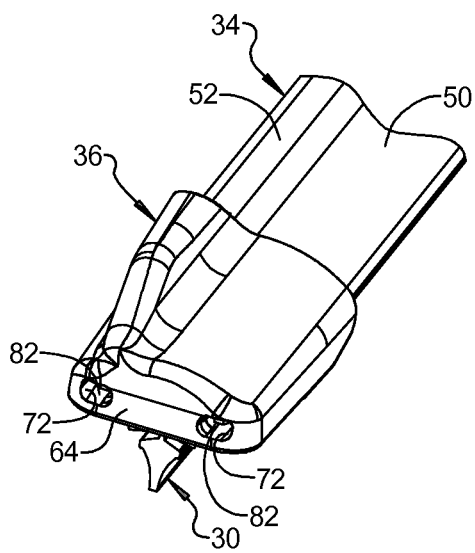
FIG. 7 is an enlarged perspective view of a portion of the wiper assembly, according to one embodiment of the present invention, of FIG. 2.

Referring to FIGS. 2 and 3, the wiper assembly 26 includes a wiping element, generally indicated at 30, that is adapted to contact the surface of the vehicle 10 to be wiped, in this representative example, the windshield 20. The wiper assembly 26 also includes a support member, generally indicated at 32, that defines a longitudinal axis and that acts to reinforce or support the wiping element 30. In the representative embodiment illustrated herein, the support member 32 is a pair of splines 32A to operatively reinforce or support the wiping element 30. The wiper assembly 26 may also include an airfoil, generally indicated at 34, to prevent the wiper assembly 26 from lifting from the surface of the windshield 20 due to drag or air flow. The wiper assembly 26 further includes one or more end caps, generally indicated at 36 and according to one embodiment of the present invention. Each of the above components will be described in greater detail below.

Figure 10:
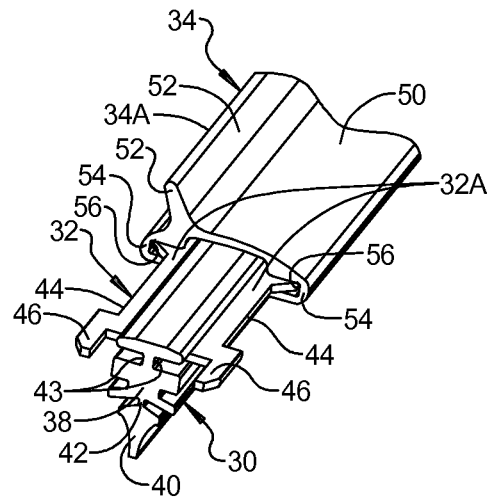
FIG. 10 is a view similar to FIG. 7 illustrating the portion of the wiper assembly, according to one embodiment of the present invention, of FIG. 2 with the end cap removed.

As illustrated in FIGS. 3 and 10, the wiping element 30 includes an upper section or portion 38 and a lower section or portion 40 that are partitioned by a longitudinally extending bridge or hinge section or portion 42. The hinge portion 42 provides flexibility between the upper portion 38 and lower portion 40 during operational movement of the wiper assembly 26 across the surface to be wiped. In the embodiment illustrated, the upper portion 38 includes opposed grooves 43 extending laterally therein and longitudinally therealong between its ends. The grooves 43 receive the splines 32A and the splines 32A cooperate with the end caps 36 as will be described in detail below. The wiping element 30 also includes a predetermined length corresponding to particular application and is often manufactured through an extrusion process, which enables the length of the wiping element 30 to be easily adjusted without a substantial increase to manufacturing expense. Furthermore, while the wiping element 30 of the present invention is constructed from a flexible rubber, those having ordinary skill in the art will appreciate that it may be constructed from any flexible material such as silicone or other polymer without departing from the scope of the present invention.

The support member 32 may be constructed from a resiliently flexible material, such as spring steel or a polymer, and is adapted to apply force from an intermediate position between its longitudinal ends. More specifically, the support member 32 receives force from the spring-loaded wiper arm 24 at an intermediate position and distributes this force across the span of the support member 32 toward its longitudinal ends. To that end, the support member 32 may be curved longitudinally with a predetermined radius of curvature. This predetermined radius of curvature is sometimes referred to in the related art as a "free form" radius of curvature. Accordingly, the curvature of the support member 32 may be symmetrical or asymmetrical depending on the force requirements and the contour of the windshield 20. The flexible, free form, pre-curved support member 32 straightens out when the wiper arm 24 applies a force thereto to flatten the support member 32 and directs the wiping element 30 to contact the windshield 20. Thus, the elongated support member 32 includes a free-form curvature that ensures force distribution on windshields having various curvatures and that effects proper wrapping about the windshield 20.

As illustrated throughout the figures, the support member 32 has a substantially constant width and may have a constant thickness throughout the length between its longitudinal ends. The constant width and thickness are adapted to provide high lateral and torsional stiffness to avoid lateral and torsional deflection, which causes the wiping element 30 to stick/slip ("chatter") on the windshield 20 during operation. Thus, the cross-section of the support member 32 has a generally rectangular outer profile that makes the support member 32 easier to manufacture. More specifically, where the support member 32 is constructed from metal, such as spring steel, the tools and machinery used to manufacture the support member 32 are less complicated than that required to manufacture having varying widths and/or thicknesses. Furthermore, where the support member 32 is constructed from a polymer, such as a thermoplastic elastomer, the tools and extrusion process machinery are also less complicated than those employed to manufacture having varying widths and/or thicknesses. However, those having ordinary skill in the art will appreciate that the support member 32 illustrated herein may include a varying thickness and/or width without departing from the scope of the present invention.

Figure 8:
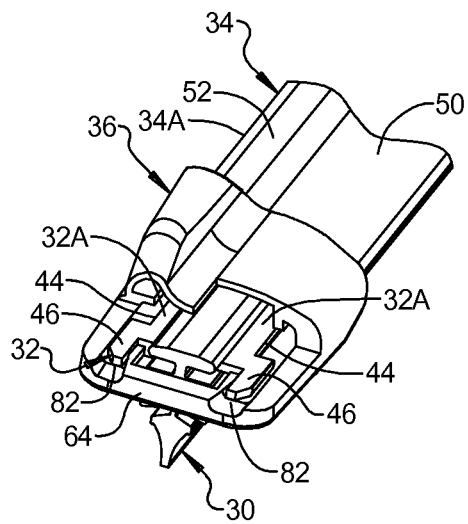
FIG. 8 is a view similar to FIG. 7 breaking away a portion of the end cap of the wiper assembly, according to one embodiment of the present invention, of FIG. 2.
Figure 9:
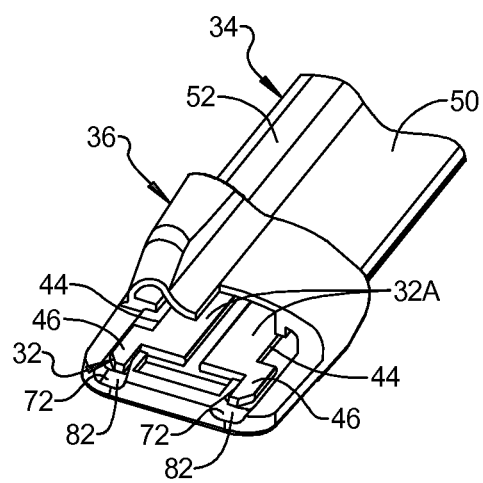
FIG. 9 is a view similar to FIG. 8 illustrating the wiping element removed from the wiper assembly.

Additionally, as illustrated in FIGS. 3, 8, and 10, the splines 32A of the support member 32 are disposed in the grooves 43 of the wiping element 30. The support member 32 may include one or more notches 44 extending therein. In the embodiment illustrated, the notches 44 are located near the longitudinal ends of the support member 32. One notch 44 extends into each side of the support member 32 such that the notches 44 oppose each other. The notches 44 are generally rectangular in shape, but may be any suitable shape. The notches 44 cooperate with the end caps 36 as will be described in detail below.

Further, the splines 32A of the support member 32 may include one or more tangs 46 extending therefrom. In the embodiment illustrated, the tangs 46 extend from the longitudinal ends of the splines 32A. One tang 46 extends longitudinally from each longitudinal end of one spline 32A. The tangs 46 are generally rectangular in shape, but may be any suitable shape. The tangs cooperate with the end caps 36 as will be described in detail below.

As noted above, the wiper assembly 26 may also include the coupler, generally indicated at 28. The coupler 28 is adapted to connect the wiper assembly 26 to the wiper arm 24. More specifically, those having ordinary skill in the art will appreciate that different OEM's employ wiper arm assemblies having different attachment members (not shown) adapted to operatively engage a specific wiper assembly. Accordingly, the coupler 28 illustrated herein includes structure that operatively engages at least one or more of these different attachment members (not shown). Further by way of example, certain wiper arms employed by OEM's include "bayonet-style"; "pin-type"; or "hook-type" attachment members of various sizes that operatively engage the wiper assemblies.

As previously noted, the wiper assembly 26 may include the airfoil, generally indicated at 34, to prevent the wiping assembly 26 from lifting from the surface of the windshield 20. The airfoil 34 is operatively mounted to the wiping element 30 and the support member 32. The airfoil 34 extends along the length of the wiping element 30 and the support member 32 between the end caps 36. The airfoil 34 acts to reduce the likelihood of wind lift by allowing air to flow over the wiper assembly 26. More specifically, and in the embodiment illustrated herein, the airfoil 34 includes a pair of airfoil components 34A that is operatively mounted to the wiping element 30 and the support member 32 with the coupler 28 extending therebetween and the end caps 36 at each longitudinal end. However, those having ordinary skill in the art will appreciate that the airfoil 34 may be defined as a single unitary component without departing from the scope of the present invention.

Referring again to FIGS. 3 and 8 through 10, the airfoil 34 includes a body 50 extending longitudinally. The airfoil 34 includes a spoiler 52 that tapers outwardly from the body 50 toward a terminal point to define a profile that is slightly contoured. The airfoil 34 includes a pair of channel members 54 extending downwardly from the body 50 opposite the spoiler 52. The channel members 54 are generally "C" shaped to form a channel 56 to receive the support member 32. The airfoil 34 is made of a suitable material such as plastic or an elastomer. In addition, the airfoil 34 may be manufactured through an extrusion process. However, those having ordinary skill in the art will appreciate that the airfoil 34 may be manufactured using any other conventional mechanism.

Referring to FIGS. 2 through 10, the wiper assembly 26 further includes the pair of end caps, generally indicated at 36 and according to one embodiment of the present invention. The end caps 36 are adapted to be disposed adjacent to the distal ends of the airfoil 34. The end caps 36 are secured to the support member 32. The end caps 36 include a profile that substantially mimics the contours of the airfoil 34 to maintain the wind lift characteristics of the wiper assembly 26 and to provide an increased aesthetic value. The end caps 36 also provide a mass increase adjacent the distal ends of the airfoil 34 that prevent localized chatter along the extremities of the wiping element 30 caused by the combination of wind lift and a decrease in the force distributed to this area from wiper arm 24 via the splines 32A, as above-described.

Referring to FIGS. 4 through 9, the end caps 36 each have a body 58 with a top wall 60, side walls 62, end wall 64, and a bottom wall 66 forming a cavity 68 extending longitudinally inwardly to receive the longitudinal end of the wiping element 30 and support member 32. The end caps 36 each have a slot 70 extending longitudinally in the bottom wall 66 and communicating with the cavity 68. The end caps 36 each have one or more apertures 72 extending through the end wall 64 and communicating with the cavity 68 to allow water to drain therethrough. The end caps 36 each have a pair of apertures 74 spaced laterally and extending through the bottom wall 66 and a pair of locking arms 76 extending from the bottom wall 66 and into the apertures 74. It should be appreciated that the locking arms 76 are cantilevered to the bottom wall 66 and can be deflected relative to the bottom wall 66 to be disposed in the notches 44 of the splines 32A to secure the end caps 36 to the support member 32.

The end caps 36 each have a separator, generally indicated at 80, to separate the splines 32A and retain the splines 32A from lateral movement. In the embodiment illustrated, the separator 80 is a pair of channels 82 spaced laterally and extending longitudinally inwardly into the bottom wall 66. The channels 82 may communicate with the apertures 72 in the end wall 64. The channels 82 are generally rectangular in shape, but may be any suitable shape to receive the tangs 46 of the splines 32A. The tangs 46 of the splines 32A are disposed in the channels 82 of the end cap 36 to separate the splines 32a and retain the splines 32A in parallel positions to improve the performance of the wiping element 30 for the wiper assembly 26 as it moves back and forth across the surface to be wiped. The end cap 36 is a hollow piece made of a material such as plastic. The end cap 36 is integral, unitary, and one-piece. It should be appreciated that the end caps 36 are pressed longitudinally onto the wiper assembly 26.

In operation, the wiper assembly 26 is assembled by sliding the support member 32 into the wiping element 30. The coupler 28 is slid onto the support member 32 and the airfoil 34 is slid onto the support member 32. The end cap 36 is slid onto each end of the support member 32 and the support member 32 deflects the locking arms 76. The end cap 36 continues to slide until the locking arms 76 are disposed in the notches 44 in the support member 32. Simultaneously, the tangs 46 of the splines 32A are disposed in the channels 82 of the end cap 36 to separate and retain the splines 32A in parallel positions. It should be appreciated that the separator 80 of the end cap 36 separates and retains the splines 32A in parallel positions, which offers enhanced wipe quality performance, as well as the ability to remove and replace the wiping element 30. It should also be appreciated that, although the end cap 36 offers the ability to remove and replace the wiping element 30 once assembled to the splines 32A, it is unlikely that such wiping element 30 would be removed and replaced, but rather the entire wiping assembly 26 would be replaced itself for the vehicle 10.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An end cap for a wiper assembly comprising:
an integral one-piece body adapted to be pressed longitudinally in a first direction onto respective end portions of a plurality of splines of the wiper assembly, which said splines are longitudinally elongate and terminate at said end portions disposed at opposite ends of said splines; and
said body including a pair of side walls, an end wall extending laterally between said side walls, a top wall and a bottom wall joined to said side walls to define longitudinally-spaced first and second body ends and a cavity which opens longitudinally outwardly from said first body end in said first direction, wherein said side walls, said end wall, said top wall and said bottom wall are formed integrally as one piece prior to assembly to said splines so as to move longitudinally together as one piece in said first direction onto said end portions at one of said opposite ends of said splines, and said second body end of said body including a separator comprised of a pair of channels extending longitudinally through said end wall and opening longitudinally in said first direction toward said splines to longitudinally receive said end portions of the splines of the wiper assembly by longitudinal movement of said body in said first direction onto said end portions, said channels arranged in spaced relation in said end wall with an intermediate portion of said end wall extending laterally between said channels to maintain lateral separation between said splines, said channels and said intermediate portion of said end wall being adapted to cooperate with the splines of the wiper assembly to separate and retain the splines laterally from movement with respect to said side walls of said body for a wiping element of the wiper assembly disposed between the splines, said channels extending along said first direction through the entire thickness of said end wall to permit water to drain longitudinally out of said cavity through said end wall.

2. An end cap as set forth in claim 1 wherein said top wall, said end wall, and said bottom wall form said cavity which opens longitudinally in said first direction to receive said end portions of the splines such that said body is longitudinally pressable in said first direction onto said end portions, said bottom wall having a slot extending longitudinally therein to receive an end portion of a wiping element of the wiper assembly.

3. An end cap as set forth in claim 2 wherein the plurality of splines include at least one groove, and said end cap further including one or more apertures extending through the bottom wall and at least one cantilevered locking arm extending from the bottom wall and into the apertures, the locking arms adapted to deflect relative to the bottom wall in a locking direction transverse to said first direction to facilitate longitudinal insertion of the end cap in said first direction onto the splines.

4. A wiper assembly as set forth in claim 3, wherein said locking arms deflect in said locking directing and lockably engage said splines in response to said longitudinal pressing of said body onto said end portion in said first direction.

5. An end cap as set forth in claim 1 wherein said channels are generally rectangular in shape.

6. An end cap as set forth in claim 1 wherein said body is integral and unitary.

7. An end cap as set forth in claim 1 wherein said body is made of a plastic material.

8. A wiper assembly comprising:
a wiping element adapted to contact a surface to be wiped;
a support member acting to support said wiping element;
an airfoil operatively mounted to said support member;
a pair of end caps operatively mounted to longitudinal ends of said support member with said airfoil disposed therebetween; and
said support member including a plurality of splines, which extend longitudinally between end portions disposed at opposite ends of said splines, and said end caps each including a one-piece body formed as one piece before assembly on said splines and adapted to be longitudinally slid as one piece in a mounting direction onto and disposed over each said end portion at one of said opposite ends of said splines, each said body including a pair of side walls, an end wall extending laterally between said side walls and a top wall and bottom wall joined to said side walls to define opposite first and second body ends and define a cavity opening longitudinally from said first body end in said mounting direction wherein said side walls, said end wall, said top wall and said bottom wall are formed integrally as said one piece with said cavity having an open side which opens in said mounting direction and longitudinally receives said end portions of said splines, said end wall being disposed at said second body end and terminating at an exterior end face which faces and is exteriorly exposed longitudinally in a facing direction that faces opposite to said mounting direction away from said cavity and away from said splines when mounted on said end portions, and a separator comprised of a pair of channels, which open through an entire thickness of said end wall and through said exterior end face in said facing direction and which extend longitudinally from said exterior end face in said mounting direction so as to open interiorly into said cavity to receive said end portion of said splines and to permit water to drain longitudinally out of said cavity through said entire thickness of said end wall, said channels arranged in spaced relation in said end wall with an intermediate portion of said end wall extending laterally between said channels to laterally separate said splines, said channels and said intermediate wall separating and retaining said splines laterally with respect to said side walls of said body for said wiping element disposed between said splines.

9. A wiper assembly as set forth in claim 8 wherein said top wall, said end wall, and said bottom wall form said cavity which opens in said mounting direction to receive an end portion of the wiping element, said bottom wall having a slot extending longitudinally therein to receive the end portion of said wiping element.

10. A wiper assembly as set forth in claim 9 wherein said channels extend longitudinally from said end wall and said splines include tangs which extend along said bottom wall and into said channels from said cavity.

11. A wiper assembly as set forth in claim 10 wherein said channels and said tangs are spaced laterally along said bottom wall with said slot disposed therebetween.

12. A wiper assembly as set forth in claim 11 wherein said wiping element comprises an upper portion, a lower portion, and hinge portion partitioning said upper portion and said lower portion.

13. A wiper assembly as set forth in claim 12 wherein said upper portion includes opposed grooves extending laterally therein and longitudinally therealong between its ends.

14. A wiper assembly as set forth in claim 13 wherein said splines are disposed in said grooves, one of said splines being disposed in one of said grooves each.

15. A wiper assembly as set forth in claim 14 wherein said channels are generally rectangular in shape.

16. A wiper assembly as set forth in claim 15 wherein said splines include tangs which project laterally and longitudinally from side edges of said splines and are generally rectangular in shape to fit into said channels.

17. A wiper assembly as set forth in claim 9 wherein the plurality of splines include at least one groove, and said end cap further including one or more apertures extending through the bottom wall and at least one cantilevered locking arm extending from the bottom wall and into the apertures, the locking arms adapted to deflect relative to the bottom wall in a locking direction transverse to said mounting direction to facilitate longitudinal insertion of the end cap in said mounting direction onto the splines.

18. A wiper assembly as set forth in claim 17, wherein said locking arms deflect in said locking directing and lockably engage said splines in response to said movement of said end portion in said mounting direction.

19. A wiper assembly as set forth in claim 8 wherein said body is integral and unitary.

* * * * *